United States Patent
Kalmar et al.

(10) Patent No.: US 9,665,350 B1
(45) Date of Patent: May 30, 2017

(54) AUTOMATIC TEST GENERATION FOR MODEL-BASED CODE COVERAGE

(75) Inventors: Zsolt Kalmar, Shrewsbury, MA (US); Gregoire Hamon, Boston, MA (US); William J Aldrich, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 1688 days.

(21) Appl. No.: 12/475,178

(22) Filed: May 29, 2009

(51) Int. Cl.
*G06F 9/44* (2006.01)
*H04L 1/24* (2006.01)
*G06F 11/36* (2006.01)

(52) U.S. Cl.
CPC .......... *G06F 8/34* (2013.01); *G06F 8/10* (2013.01); *G06F 11/3684* (2013.01); *H04L 1/244* (2013.01)

(58) Field of Classification Search
None
See application file for complete search history.

(56) References Cited

U.S. PATENT DOCUMENTS

| | | | |
|---|---|---|---|
| 5,541,849 A * | 7/1996 | Rostoker et al. | 716/102 |
| 6,378,109 B1 * | 4/2002 | Young et al. | 716/115 |
| 6,412,101 B1 * | 6/2002 | Chang et al. | 716/104 |
| 7,035,786 B1 * | 4/2006 | Abu El Ata et al. | 703/21 |
| 7,085,700 B2 * | 8/2006 | O'Riordan et al. | 703/14 |
| 7,454,324 B1 * | 11/2008 | Seawright et al. | 703/14 |
| 7,783,468 B2 * | 8/2010 | Abu el Ata et al. | 703/22 |
| 7,937,281 B2 * | 5/2011 | Miller et al. | 705/7.12 |
| 8,032,329 B2 * | 10/2011 | Chou et al. | 702/182 |
| 8,234,105 B1 | 7/2012 | Aldrich et al. | |
| 8,423,879 B2 * | 4/2013 | Bhatt et al. | 714/819 |
| 8,490,068 B1 * | 7/2013 | Sholtis et al. | 717/136 |
| 8,713,528 B1 * | 4/2014 | Conrad et al. | 717/124 |
| 2002/0193892 A1 * | 12/2002 | Bertsch et al. | 700/31 |
| 2003/0033191 A1 * | 2/2003 | Davies et al. | 705/10 |
| 2004/0103058 A1 * | 5/2004 | Hamilton | 705/38 |
| 2004/0193390 A1 * | 9/2004 | Drennan et al. | 703/2 |
| 2005/0177807 A1 * | 8/2005 | Ma et al. | 716/5 |
| 2008/0313600 A1 * | 12/2008 | Moore | 717/104 |

* cited by examiner

*Primary Examiner* — Henry Tsai
*Assistant Examiner* — John Roche
(74) *Attorney, Agent, or Firm* — Harrity & Harrity, LLP

(57) ABSTRACT

A computer-implemented method includes obtaining a first representation of a system, obtaining a set of test obligations, and automatically generating one or more test cases from the first representation based on the set of test obligations. The method further includes obtaining a second representation that is related to the first representation, obtaining an analysis criterion for the second representation, and assessing the analysis criterion using the one or more test cases applied to the second representation. Based on the assessing, one or more additional test obligations may be identified and a second set of one or more test cases may be generated based on the one or more additional test obligations.

25 Claims, 10 Drawing Sheets

| Function | File | Line No. | Size (bytes) | Start address | Times called | % cover. | Total instr. | Cycle Total | Cycle CPU |
|---|---|---|---|---|---|---|---|---|---|
| Function1 | File1 | 123 | 2567 | 0x00200 | 1 | 100 | 14 | 31 | 31 |
| Function2 | File2 | 54 | 684 | 0x00320 | 0 | 0 | 0 | 0 | 0 |
| Function3 | File3 | 21 | 212 | 0x00258 | 1 | 100 | 53 | 90 | 90 |
| Function4 | File4 | 79 | 1664 | 0x00508 | 1 | 100 | 16 | 37 | 37 |

```
01 function out = main_fcn(in1, in2, in3)
02   if (in1 < 0)
03     out = sub_fcn(in2, in3);
04   else
05     out = sub_fcn(-in2, in3);
06   end
07
08 function s_out = sub_fcn(s_in_1, s_in_2)
09   if (s_in_2==0)
10     s_out = s_in_2 + s_in_1;
11   else
12     s_out = s_in_2 - s_in_1;
13   end
14
```

Original

820

```
01 function out = main_fcn(in1, in2, in3)
02   if (in1 < 0)
03     if (in3 == 0)
04       out = in3 + in2;
05     else
06       out = in3 - in2;
07     end
08   else
09     if (in3 == 0)
10       out = in3 - in2;
11     else
12       out = in3 + in2;
13     end
14   end
15
16
```

Inlined

FIG. 8

AUTOMATIC TEST GENERATION FOR MODEL-BASED CODE COVERAGE

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 6 depicts an exemplary output for an automatic test associated with the concepts described herein;

FIGS. 7 and 8 are a diagrams illustrating relationships between expressions in a representation to expressions in other representations;

DETAILED DESCRIPTION

The following detailed description refers to the accompanying drawings. The same reference numbers in different drawings may identify the same or similar elements. Also, the following detailed description does not limit the invention.

Overview

Coverage analysis may generally refer to techniques that indicate the completeness and consistency of a set of test cases for a representation, such as programming code or an executable model. Test cases may be related to requirements. Code coverage and model coverage are two coverage analysis techniques that can be used to perform coverage analysis of programming code or executable models.

Code coverage analyzes the way a program executes and provides a measure of completeness of testing based on the code of a program being analyzed, for example the structure of the program code. Robust code coverage may include statement coverage, decision coverage and/or condition coverage. Modified condition-decision coverage (MC/DC) can be used when more rigorous analysis of conditions in a program are analyzed. MC/DC coverage may imply that each input of a logical expression has been shown to independently change the expression outcome while the other conditions are held constant. Other coverage analyses may indicate the set or range of values of a variable that has been covered, the dimensions of signal that have been exercised, the entries in a table that have been accessed, the elements of a set that have been accessed, a set of specific outcomes for a number of decision points (e.g., path coverage), etc.

Model coverage analyzes the way a model executes. Model coverage may strive to provide the equivalent information of code coverage in the context of an executable model, such as an executable graphical model, as the model simulates. Model coverage may analyze the control flow within a model and may dynamically update coverage data for components of a model when the objects representing the components are instantiated. Full model coverage may occur when all possible outcomes for components of the model occur.

Code coverage and model coverage may use test cases to exercise the code/model when performing coverage analyses. Full code or model coverage may require that test cases cause all possible outcomes of the code or model to occur.

Implementations described herein relate to analysis against user-defined coverage criteria of code generated from a model. This analysis may involve verification, validation, testing, etc., and may evaluate coverage criteria. The coverage criteria may be, for example, structural code coverage and/or functional coverage derived from other design requirements.

Figure 1:
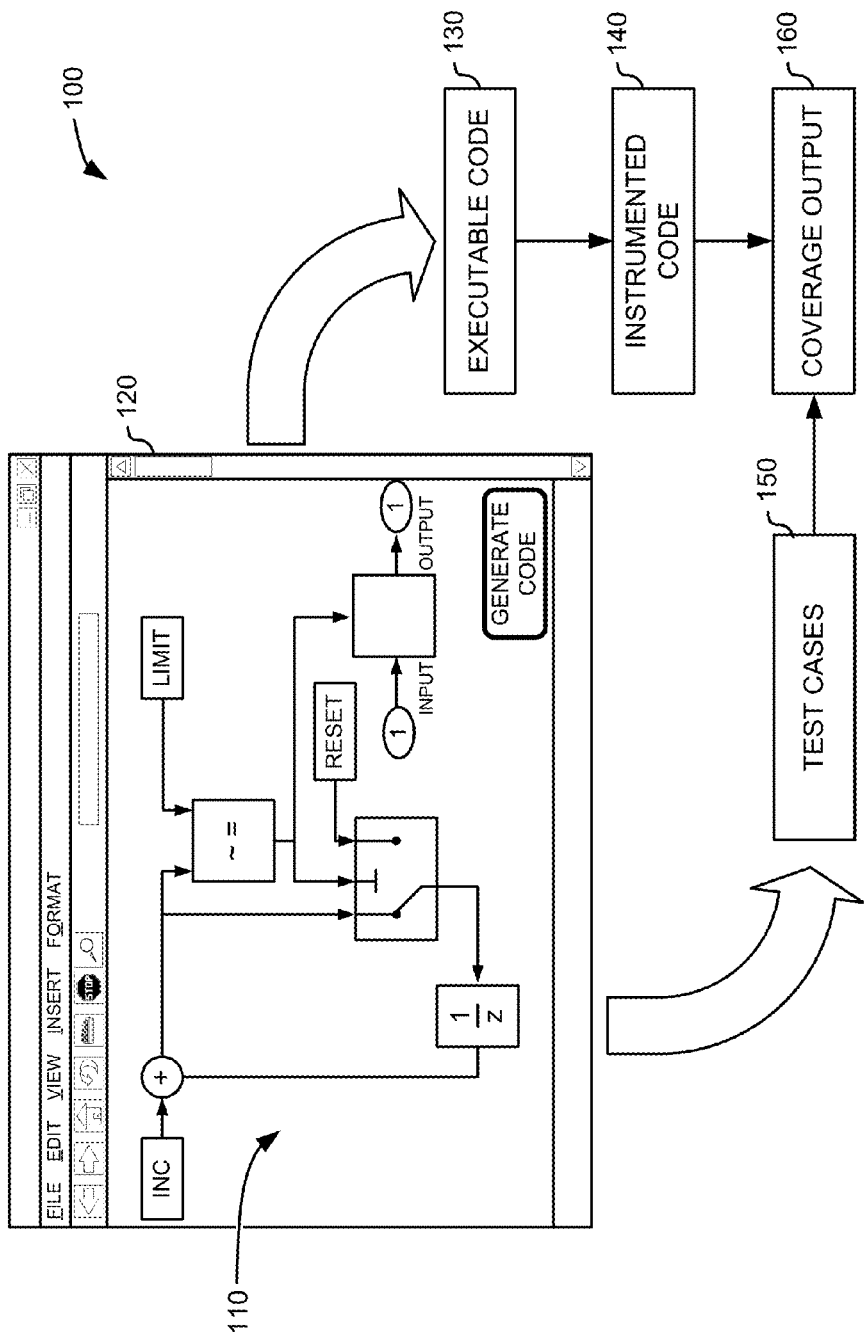
FIG. 1 is a diagram illustrating an exemplary environment in which systems and/or methods described herein may be implemented.

FIG. 1 illustrates an exemplary environment 100 in which systems and/or methods described herein may be implemented. Environment 100 may include graphical model 110 shown within a user interface screen 120, executable code 130, instrumented code 140, test cases 150, and coverage output 160.

Graphical model 110 may include code that facilitates simulating a physical system. Model 110 may be implemented in a graphical modeling environment (including, e.g., user interface 120) running on a computing device. Graphical modeling environments (such as Simulink® from The MathWorks, Inc. of Natick, Mass.) may assist in simplifying the process of designing, simulating, and implementing dynamic systems. Graphical model 110 may include a representation of a real-world system through a graph containing nodes (e.g., blocks) interconnected by arcs (e.g., lines). As used herein "blocks" may be functional entities that receive data, output data, store data, and/or perform operations, transformations, establish relations such as constraints, on the data and information being processed by the system. As used herein, "lines" may represent streams of information, such as data, data types, timing information, and control information, flowing into, out of, and between various blocks. Non-limiting examples of graphical model 110 may include time-based graphical models, time-based block diagrams, data flows, unified modeling language (UML) diagrams, Systems Modeling Language (SysML), Architecture Analysis and Design Language (AADL), UML Profile for Modeling and Analysis of Real-time and Embedded Systems (MARTE), and state transition diagrams. A graphical model or a portion of a graphical model may be implemented using a textual representation, such as, for example, a representation provided by an Embedded MATLAB® (EML) environment. A textual representation may be in a language that is dynamically typed, that is array based, etc.

Consistent with implementations described herein, graphical model 110 may be translated into executable code 130. When executable code 130 is executed, functions implemented by graphical model 110 may be performed. In certain situations, it may be desirable to gather coverage information about executable code 130 as the code executes. For example, it may be desirable to determine if all or portions of executable code 130 are run against all possible conditions for graphical model 110.

In an implementation, graphical model 110 may be translated into executable code 130 that can be augmented with additional code (e.g., instrumentation code) that gathers information about executable code 130 while executable code 130 executes. Instrumented code 140 may be produced in situations where executable code 130 is combined with instrumentation code. In some implementations, instrumented code 140 may include executable code 130 that is rewritten to include instrumentation code so that the instrumentation code may collect information about the performance of executable code 130.

Test cases 150 may include information upon which the instrumented code 140 can be executed. Test cases 150 may include, for example, a set of coverage points that may be compiled from a variety of sources based upon user-defined coverage criteria. As used herein a "coverage point" may generally be a decision, condition, or expression in a code associated with a model. Each coverage point typically has a fixed number of mutually exclusive outcomes. In other implementations a coverage point may also include a data access evaluation such as a memory location, an array index, an element in the variable domain, a dimension of a signal that may be of variable dimension, etc.

When instrumented code 140 is executed against test cases 150, a coverage output 160 may be produced. Coverage output 160 may include information that indicates whether executable code 130 achieved a particular coverage. Coverage output 160 may be, for example, displayed, stored, or transmitted to a destination. In implementations described herein, the test cases 150 may be automatically generated and improved through an iterative process until coverage output 160 indicates that user-defined coverage criteria for executable code 130 has been achieved, until other user-defined conditions are satisfied, or until another criteria or condition is met.

System Description

Figure 2:
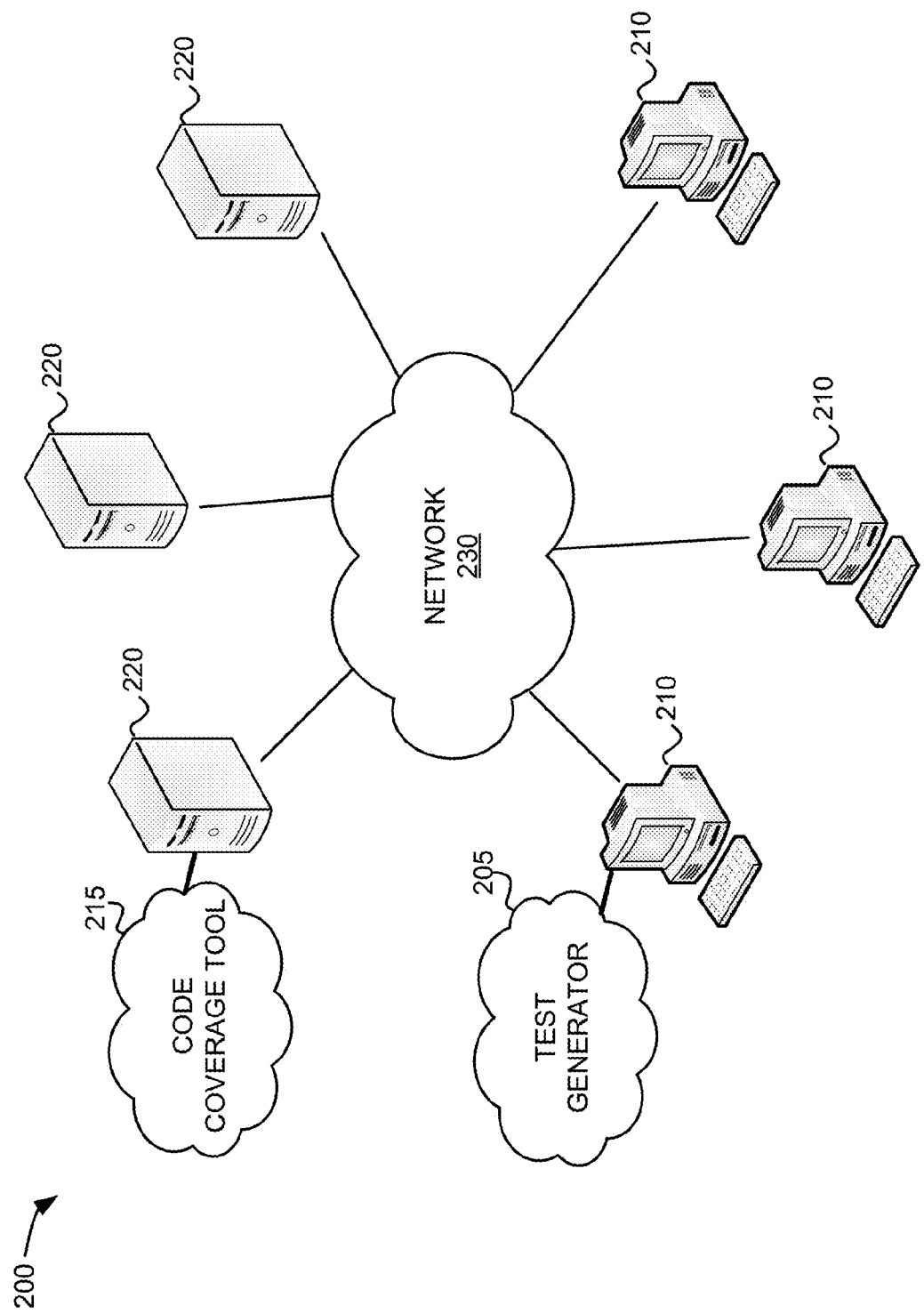
FIG. 2 is a diagram illustrating an exemplary environment associated with the concepts described herein.

FIG. 2 an exemplary diagram of a system 200 in which concepts described herein may be implemented. The system may include one or more personal computers or workstations 210, one or more servers 220, and a network 230. Consistent with aspects described herein, test generator 205 and code coverage tool 215 may be executed by one or more workstations 210 and/or servers 220 to assist in software verification.

Workstations 210 may include computing devices, such as desktop or laptop computers, that may be used for general computing tasks. In general, users of workstations 210 may be engineers, scientists, etc. that develop models to represent a simulated system.

Servers 220 may each include a device, such as a computer or another type of computation or communication device, a thread or process running on one of these devices, and/or an object executable by one of these devices. Server device 220 may generally provide services to other devices (e.g., workstations 210) connected to network 230. In one implementation, one or more of server devices 220 may include server components of test generator 205 and/or code coverage tool 215.

Workstation 210 and/or one or more servers 220 may automatically generate program code from the models that users develop to represent a system. The users may use test generator 205 and code coverage tool 215 to assist in performing coverage analysis of the automatically generated code. Test generator 205 may compile test cases to be executed in code coverage tool 215. Test generator 205 may then provide revised or substitute test cases based on results reported from code coverage tool 215.

In some implementations, test generator 205 may include client-side components and server-side components. The client-side components may be executed at the user's workstation 210 while the server-side components may execute at one or more of servers 220. In an alternative implementation, and possibly under certain restrictions on use such as the size of the code to be verified, test generator 205 may execute exclusively at the user's workstation 210. Similarly, in some implementations, code coverage tool 215 may also include client-side components and server-side components.

Figure 3:
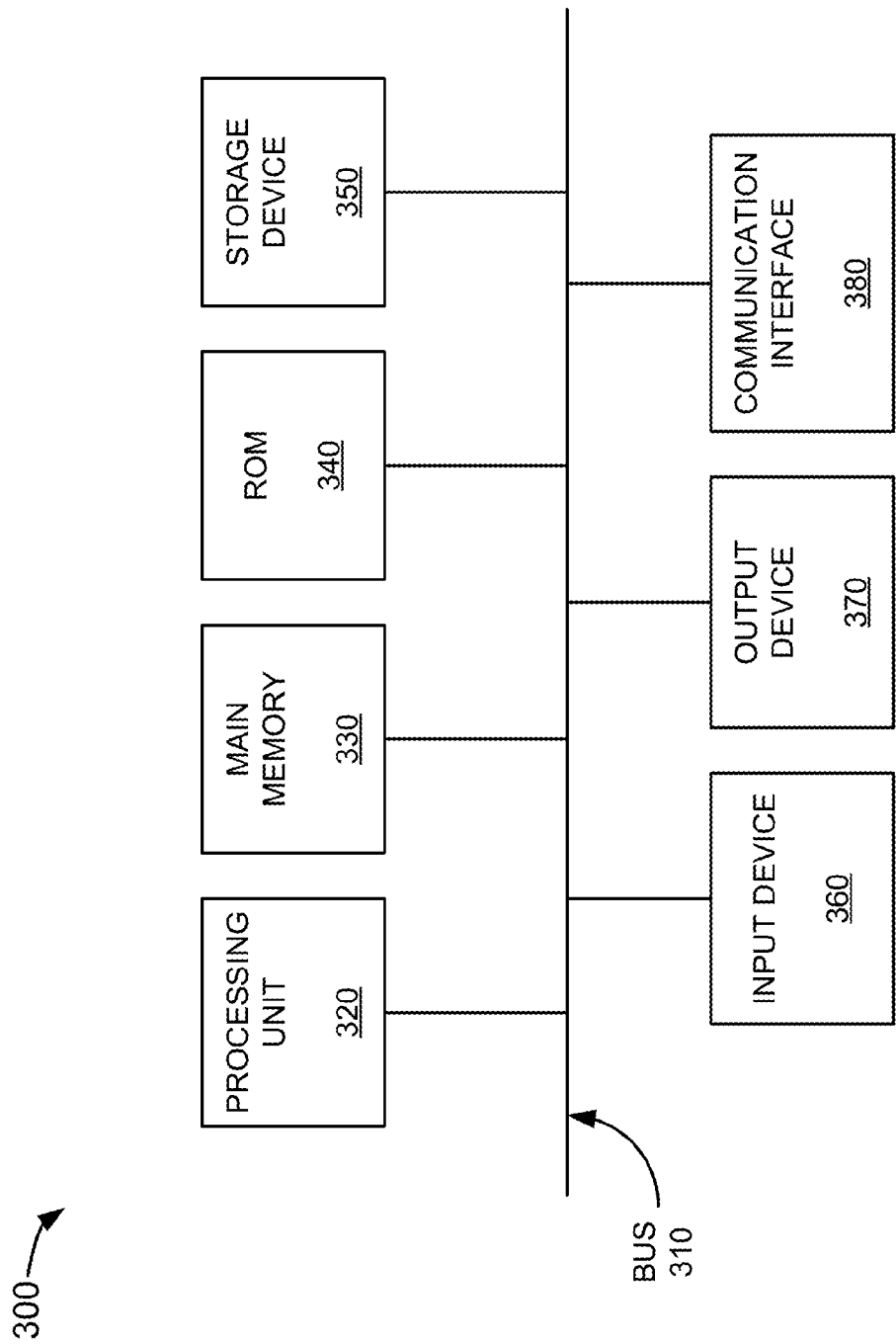
FIG. 3 is a diagram illustrating exemplary components of the devices depicted in FIG. 1.

FIG. 3 is a diagram of an exemplary device 300 corresponding to one of workstations 210 or servers 220. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include a processor, microprocessor, or other types of processing logic, such as an application specific integrated circuit (ASIC), field programmable gate array (FPGA), etc., that may interpret and execute instructions. Main memory 330 may include a random access memory (RAM) or another type of dynamic storage device that may store information and instructions for execution by processing unit 320. ROM 340 may include a ROM device or another type of static storage device that may store static information and/or instructions for use by processing unit 320. Storage device 350 may include a magnetic, solid state, optical, and/or other recording medium and its corresponding drive.

Input device 360 may include a mechanism that permits an operator to input information to device 300, such as a keyboard, a mouse, a pen, a microphone, a touch-sensitive input (e.g., a touch-sensitive display), voice recognition, accelerometer, camera, and/or biometric mechanisms, etc. Output device 370 may include a mechanism that outputs information to the operator, including a display, a printer, a speaker, a haptic device, etc. Communication interface 380 may include any transceiver-like mechanism that enables device 300 to communicate with other devices and/or systems. For example, communication interface 380 may include mechanisms for communicating with another device or system via a network, such as network 230.

As will be described in detail below, device 300 may perform certain operations in response to processing unit 320 executing instructions such as software instructions contained in a computer-readable medium, such as main memory 330. A computer-readable medium may be defined as a physical or logical memory device. The software instructions may be read into main memory 330 from another computer-readable medium, such as storage device 350, or from another device via communication interface 380. The software instructions contained in main memory 330 may cause processing unit 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations device 300 may contain fewer, different, or additional components than depicted in FIG. 3. In still other implementations, one or more components of device 300 may perform one or more tasks performed by one or more other components of device 300.

Code Test Generator

Figure 4:
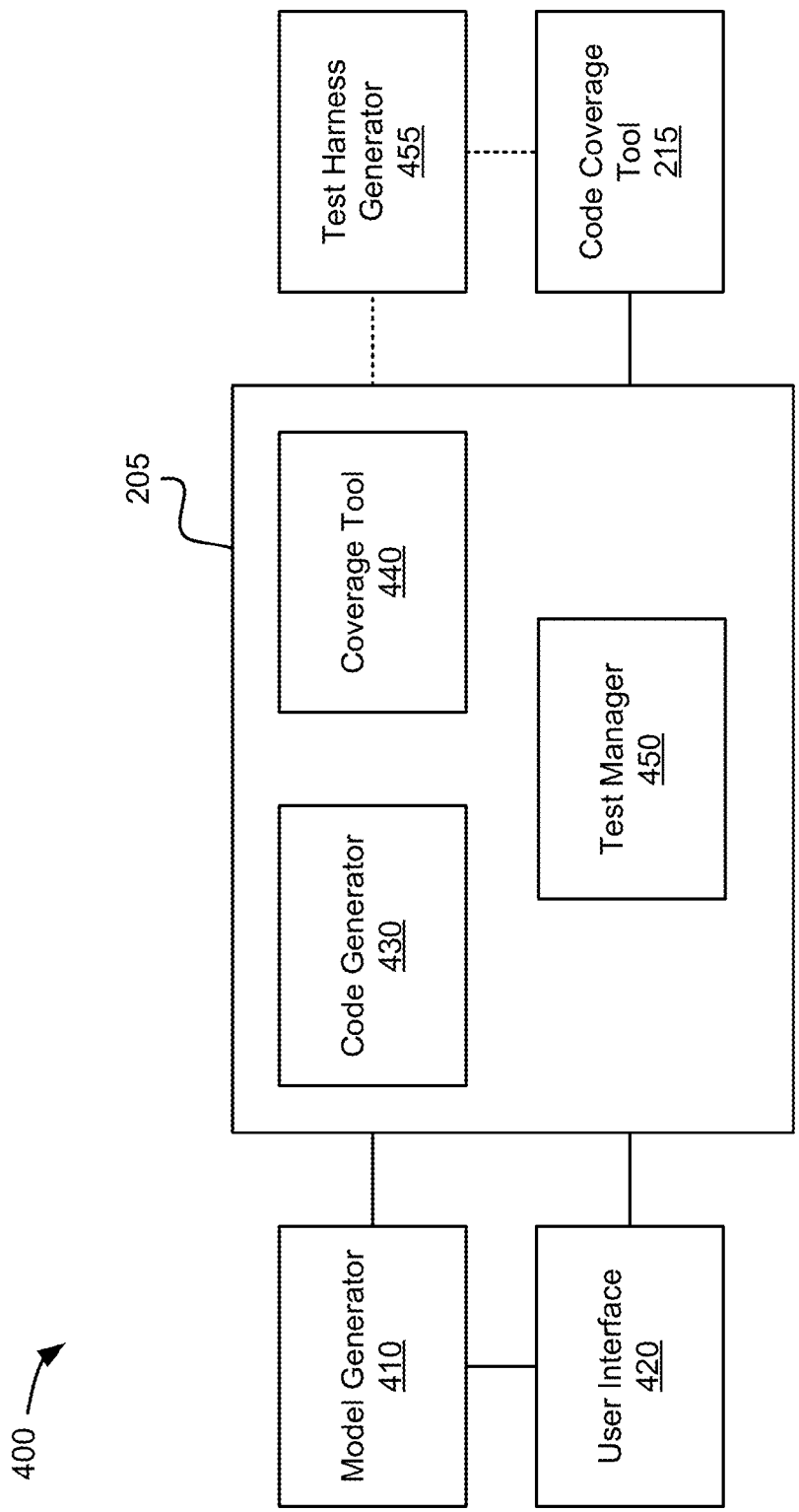
FIG. 4 is a diagram illustrating exemplary components of the automatic test generation environment depicted in FIG. 1.

FIG. 4 is a diagram illustrating exemplary components of an automatic test generation environment 400. Environment 400 may include graphic model generator 410, user interface 420, code test generator 205, test harness generator 455, and code coverage tool 215. Test generator 205 may include code generator 430, coverage tool 440, and test manager 450.

Model generator 410 may include hardware, software, and/or a combination of hardware and software to that allows a user to develop a model of, for example, a multi-domain dynamic system. The model may be constructed by assembling design components, each of which could be a separate model. The design components may be customized to provide, for example, a simulation of a particular system. A model may be graphical or textual. For example, an EML model may be a textual representation that may relate to C code. EML may allow computations to be presented in an array-based form. EML may not require the user to explicitly define the dimensions (number and size) of variables. The C code may be automatically generated from the EML model and this generating may require determining dimensions, data types, memory allocations, iterator loops, etc. A model may be considered a higher-level representation of code so that additional information about the execution of a model is used for the generation of the code. For example, a time-based block diagram model may not explicitly state the order in which functionality is executed. When code is generated, this execution information may be derived by the time-based block diagram compiler and included in the code generation. As another example, a time-based block diagram model may be un-typed and implicitly rely on a double data type. The generated code may explicitly require doubles, Booleans, fixed-point data types, char, etc. to be determined.

User interface 420 may be implemented in workstation 210 to allow a user to, for example, define and/or alter coverage analysis criteria for the program code. For example, user interface 420 may include variable input mechanisms (e.g., an input field, a drop-down menu, and/or other similar input mechanisms) that may be selected if the user hovers over or clicks on the mechanisms. If a variable input mechanism is selected, a user may input variables associated with coverage criteria and/or coverage points for a program code undergoing coverage analysis.

As previously mentioned, test generator 205 may be used in the context of a technical computing environment to automatically generate tests for coverage analysis of program code, such as model-based code from code generator 430. More generally, although test generator 205 may be used in the context of a technical computing environment, test generator 205 may be used with any software development project. For example, test generator 205 may analyze code written in a programming language, such as C++, C, Ada, FORTRAN, Java, hardware description language (HDL), structured text, etc., and which is produced manually by a developer with or without the use of a graphical modeling environment. In other implementations, test generator 205 may analyze intermediate representations, control flow graphs, data flow graphs, and combinations.

Code generator 430 may include hardware and/or a combination of hardware and software to automatically generate program code for developing and testing models from model generator 410. For example, code generator 430 may receive a model (e.g., a block diagram model) from model generator 410, and may generate source code files, linker files, object code, and/or program based on the received information. In one implementation, the code may be generated for a specific target, for example an embedded processor in a control or signal processing application. The target may be a general purpose processor, a digital signal processor (DSP), a field programmable gate array, etc., as well as a combination of these. The target may be operating in real-time, for example by executing a real-time operating system. The code may include statements to perform intrinsic operations of the target such as, for example, a finite Fourier transform (FFT) on a DSP. Such a statement may embed, for example, assembly code in C code. In an exemplary implementation, code generator 430 may include the Real-Time Workshop® available from The MathWorks, Inc.

Code generator 430 may also generate mapping information based on an analysis of the coverage requirements that exist in the model and the coverage requirements that exist in the code. Model and/or code coverage requirements may be user-defined requirements, such as structural coverage in the generated code (e.g., statement coverage, decision coverage, condition/decision coverage, modified condition/decision coverage (MC/DC), etc.), functional coverage defined in the design model, object code coverage, etc. The analysis may determine how constructs in the code that require coverage are related to constructs in the model that require coverage. This analysis can be possible because code generator 430 has information about the elements that make up the abstract design (e.g., from model generator 410) and the interpretation of these elements in the generated source code. Accordingly, code generator 430 can collect model coverage based upon the structure of the model and the instances of the primitive elements (e.g., the code segments) used to implement the model.

Coverage tool 440 may include hardware and/or a combination of hardware and software to identify coverage points in the code based on the coverage criteria. Coverage tool 440 may compile a set of coverage points based on objectives defined by the user that may include implicit structural coverage points from the design model, user-defined coverage points, coverage for optimization induced discrepancies, and/or customized coverage points. Customized coverage points may include particular coverage points provided by a user, coverage points derived from system functions created by a user, and/or coverage points identified to modify coverage results, such as correct coverage deficiencies from previous testing. Coverage tool 440 may generate one or more test cases based on the set of compiled coverage points. Coverage tool 440 may, for example, provide input values to trigger execution of the code on the coverage points.

Test harness generator 455 may provide an automated test framework that incorporates test content from coverage tool 440. Test harness generator may allow for automated testing of a set of test cases. Test harness generator 455 may be an optional component. In other implementations, test harness 455 may be incorporated into one or more other components of environment 400. The test harness may consist of code generated for, for example, a specific target device.

Code coverage tool 215 may execute test cases provided by coverage tool 440 and/or test harness generator 455. Code coverage tool 215 may, for example, perform dynamic verification analysis by compiling the code and then executing it multiple times, with each execution using a different test case from the set of defined test cases. As a result of the dynamic verification analysis, code coverage tool 215 may output additional coverage results that may provide additional coverage information about the code. Code coverage tool 215 may record any of several different types of coverage, such as structural coverage, functional coverage, assertions, etc. Code coverage tool 215 may also provide (e.g., to code test generator 205) application program interface (API) access to coverage points definitions and coverage results.

Test manager 450 may include hardware, software, and/or a combination of hardware and software to receive results from code coverage tool 215 and identify coverage deficiencies in the testing. Test manager 450 may be in communication with code generator 430, user interface 420, and coverage tool 440 to translate areas of missing coverage into new coverage points that can be compiled into new test cases to be provided to code coverage tool 215 for subsequent testing.

Although FIG. 4 illustrates exemplary components of automatic test generation environment 400, in other implementations, automatic test generation environment 400 may include fewer, additional, different and/or differently arranged components than those depicted in FIG. 4. In still other implementations, one or more components of automatic test generation environment 400 may perform one or more other tasks described as being performed by one or more other components of automatic test generation environment 400. Also, in some implementations, components of automatic test generation environment 400 may perform tasks concurrently (e.g., by executing different test cases on different processors).

Exemplary Processing

Figure 5:
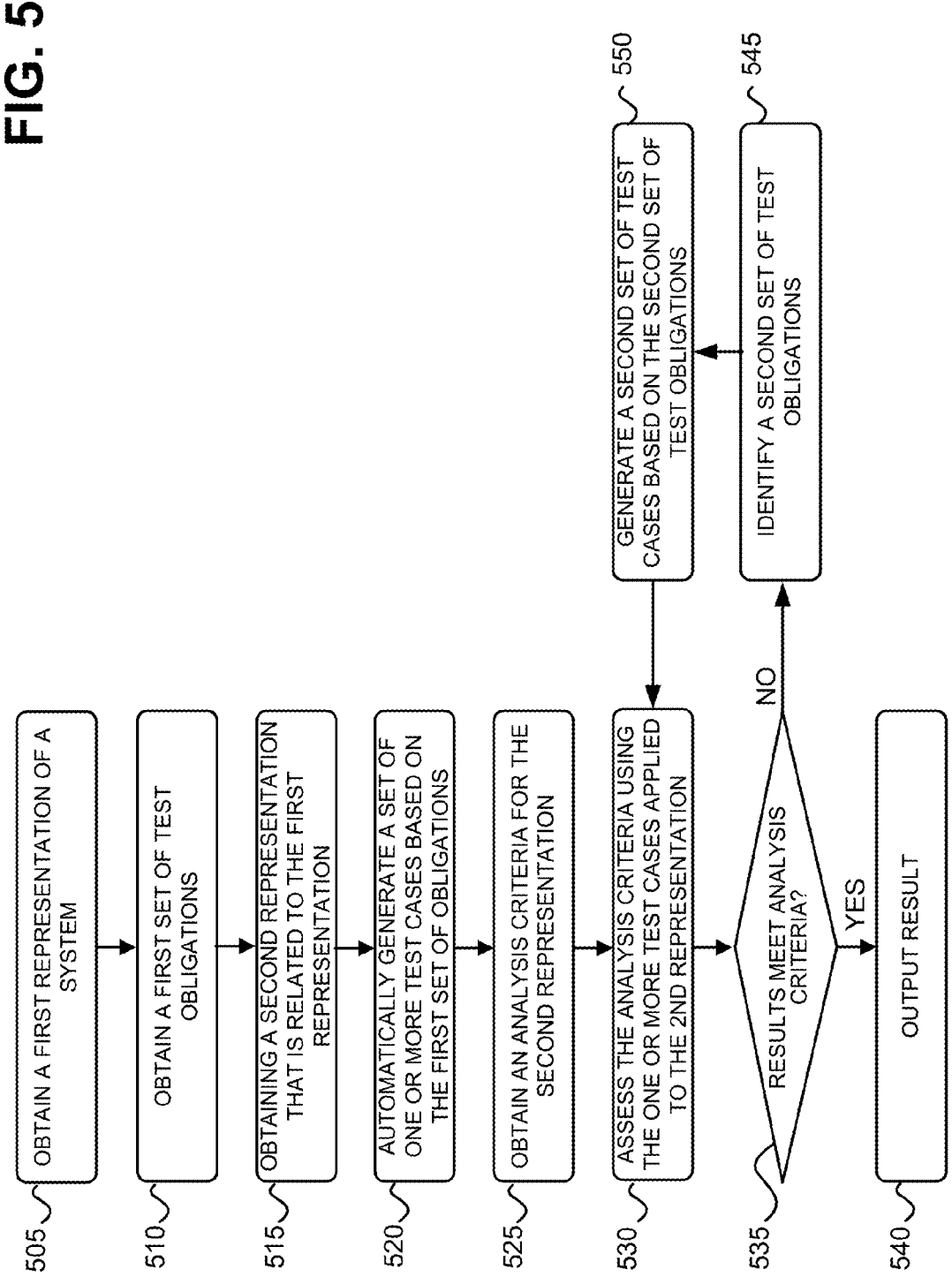
FIG. 5 is a flow diagram related to processes associated with the concepts described herein.

FIG. 5 is a flow chart illustrating exemplary operations that may be performed by test generator 205 in conjunction, for example, with other components of environment 400.

The operations may begin by obtaining a first representation of a system (block 505). In some implementations, a representation of a system may include time-based graphical models, time-based block diagrams, data flows, unified modeling language (UML) diagrams, or state transition diagrams. For example, test generator 205 may receive a design model from model generator 410. The design model may be a graphical model, such as graphical model 110 of FIG. 1. In other implementations, the first representation of a system may be computer code (e.g., source code, object code, assembly code, etc.).

A first set of test obligations may be obtained (block 510). As used herein, a test obligation may be a condition based on data values or a condition based on a sequence of data values. A test obligation may also be a constraint on a property or a property. For example, a test obligation may be a model property relevant to satisfying coverage criteria. For example, in one implementation, test generator 205 may receive (e.g., from a user via user interface 420) a set of coverage criteria for the design model. The coverage criteria may invoke test obligations, such as a range of values or conditions for a particular test case required to satisfy the coverage criteria. Thus, test generator 205 may identify values to satisfy the coverage criteria. Depending on the representation being used, coverage criteria may include, for example, functional coverage defined in the design model, structural coverage in the generated code, object code coverage, etc. Structural coverage in the generated code may include statement coverage (i.e., verifying that every statement in a program has executed at least once), decision coverage (i.e., verifying that each control flow point in a program has taken every possible outcome at least once), condition coverage (i.e., verifying that every condition to a logical statement has taken a true and a false value at least once) and/or path coverage (i.e., verifying that all possible paths in at least part of the control flow have executed at least once). For example, a user could decide to generate only tests that provide 100 percent decision coverage for the model. To support such criteria, test generator 205 may identify values for variables that will ensure all decision outcomes of the first representation will be tested. Test generator 205 may also obtain coverage criteria for the program code from default criteria based on, for example, industry standards. In other implementations, the test obligations may be based on customized coverage criteria define by a user.

A second representation that is related to the first representation may be obtained (block 515). In some implementations (e.g., where the first representation is a model), the second representation may be computer code (e.g., source code, object code, assembly code, etc.). For example, test generator 205 (e.g., code generator 430) may generate an alternate representation of the model provided by model generator 410. In one implementation, code generator 430 may automatically generate program code based on the design model received from model generator 410. The automatically generated program code may be compiled from code segments that correspond to primitive blocks used in the model. For example, each code segment may be a segment of C code that corresponds to a primitive block. In some implementations, code segments may be implemented in a form other than relatively low level computer code. For example, each code segment may include intermediate representations of the semantics of the graphical model primitives.

In other implementations, a second representation related to the first representation may be generated by a separate (external) component and provided to code test generator 205. In another implementation where the first representation is a computer code, the second representation of a system may be a model, such as a graphical model, a control flow graph (CFG), decision tree, or a different form of code than used in the first representation. Examples of relationships between representations are described further with respect to FIGS. 7 and 8 below.

Continuing with FIG. 5, a set of one or more test cases may be automatically generated based on the test obligations (block 520). For example, in one implementation, a test case may be generated based on test obligations derived from functional coverage criteria for the model. Test generator 205 (e.g., coverage tool 440) may compile a set of coverage points to be tested. Coverage points may include, for example, implicit structural coverage points from the design model, user-defined coverage points, coverage for optimization induced discrepancies, customized coverage, and/or additional (e.g., missing) coverage points identified from prior iterations. Coverage points are described further with respect to FIG. 9 below. In one implementation, test generator 205 may also generate a test harness that can be used with an external code coverage tool (e.g., code coverage tool 215). In other implementations, test generator 205 may provide test content that may be developed into a test harness using an external tool.

Analysis criteria for the second representation may be obtained (block 525). For example, test generator 205 may receive user input (e.g., from user interface 420) for test success criteria. Test success criteria may include qualitative criteria (e.g., demonstrating a particular set of results) and/or quantitative criteria (e.g., completing a particular number of cycles). In one implementation, test success criteria may include one or more of attaining a particular percentage of the coverage criteria, performing a particular number of test iterations, or conducting the test for a particular period of time.

The analysis criteria may be assessed using the one or more test cases applied to the second representation (block 530). For example, test generator 205 may provide test cases to an external code coverage tool (e.g., code coverage tool 215). The external code coverage tool may run tests based on test cases supplied by code test generator 205. The external code coverage tool may provide test results to code test generator 205.

It may be determined if the test results meet the analysis criteria for the second representation (block 535). For example, test generator 205 may analyze coverage results from the external code coverage tool (e.g., code coverage tool 215) to determine if the test success criteria have been achieved. Generally, test generator 205 may determine if all decision points were tested. If the test results meet the analysis criteria for the second representation (block 535—YES), then test generator 205 (e.g., test manager 450) may output results to the user (block 540), and the process may be completed. FIG. 6 provides an exemplary coverage verification results display that may be provided to the user.

Referring to FIG. 6, a diagram illustrating an exemplary user interface 600 in which verification results may be presented to a user. User interface 600 may include a graphical user interface (GUI) or a non-graphical user interface, such as a text-based interface, and/or other forms of APIs that may be programmatically accessed. User interface 600 may provide display information to users (e.g., users of workstation 210) via a customized interface (e.g., a proprietary interface) and/or other types of interfaces (e.g., a browser-based interface). User interface 600 may receive user inputs via one or more input devices (e.g., input device 360), may be user configurable (e.g., a user may change the size of the user interface, information displayed in the user interface, color schemes used by the user interface, positions of text, images, icons, windows, etc., in the user interface, etc.), and/or may not be user configurable. User interface 600 may be displayed to a user via one or more output devices (e.g., output device 370).

User interface 600 may include a table 605 that provides code coverage information (e.g., via fields and records). Table 605 may include a variety of fields providing code coverage information, such as a function field 610, a file field 615, a line number field 620, a size field 625, a start address field 630, a times called field 635, a percent coverage field 640, a total instructions field 645, a cycle total field 650, and/or a cycle CPU field 655.

Function field 610 may include information about a function of the code (e.g., a record of function field 610 indicates a function name "Function1"). File field 615 may include information associated with a file corresponding to the function provided in function field 610 (e.g., a record of file field 615 may include an entry "File1"). Line number field 620 may include a line number(s) of the code that corresponds to the function provided in function field 610 (e.g., a record of line number field 620 may include an entry "123" indicating that "Function1" is located on line number "123" of the code). Size field 625 may include size information (e.g., in bytes) that corresponds to the file provided in file field 615 (e.g., a record of size field 625 may include an entry "2567" indicating that "File1" has a size of "2567 bytes").

Start address field 630 may include a start address corresponding to the function provided in function field 610 (e.g., a record of start address field 630 may include an entry "0x00200" indicating that "Function1" has a start address of "0x00200"). Times called field 635 may include a number of times the function provided in function field 610 is called by the code (e.g., a record of times called field 635 may include an entry "1" indicating that "Function1" was called once by the code). In some implementations, times called field 635 may correspond to a coverage metric, such as a coverage requirement that each function be called a certain number of times (e.g., at least once). Thus, times called field 635 may clearly indicate code coverage deficiencies by comparing each entry in field 635 with a number associated with a coverage requirement. Percent coverage field 640 may include a percent coverage by the function provided in function field 610 (e.g., a record of percent coverage field 640 may include an entry "100" indicating that "Function1" has 100% coverage). For example, a function with two possible outcomes (e.g., true/false) may be deemed to have 100% coverage if testing encounters both outcomes. If only one or none of the two possible outcomes is encountered, 50% or 0% coverage, respectively, may be indicated in percent covered field 640.

Total instructions field 645 may include a number of instructions of the function provided in function field 610 (e.g., a record of total instructions field 645 may include an entry "14" indicating that "Function1" has "14" instructions). Cycle total field 650 may include a total number of cycles executed by the function provided in function field 610 (e.g., a record of cycle total field 650 may include an entry "31" indicating that "Function1" executed "31" cycles). CPU cycle field 655 may include a number of CPU cycles executed by the function provided in function field 610 (e.g., a record of CPU cycle field 655 may include an entry "31" indicating that "Function1" executed "31" CPU cycles).

Returning again to FIG. 5, if the test results do not meet the analysis criteria for the second representation (block 535—NO), then a second set of test obligations may be identified (block 545). The second set of test obligations may be used to address missing coverage points exposed by the test results. Missing coverage points are described further with respect to FIG. 10 below. In one implementation, a user may be given the opportunity to indirectly revise the test obligations previously provided (i.e., with respect to block 510) by revising the coverage criteria. The revised coverage criteria may invoke revised test obligations. For example, the user may set new limits for attaining a percentage of coverage criteria; performing a particular number of test iterations; or conducting the tests for a particular period of time. In another implementation, the user can indicate specific test objectives and/or obligations to address missing coverage points exposed by the test results. In other implementations, the second set of coverage criteria may be identical to the original coverage criteria.

A second set of test cases may be generated based on the second set of test obligations (block 550). For example, test generator 205 (e.g., test manager 450) may translate coverage deficiencies (i.e., the not covered items) into new coverage points. In one implementations, test generator 205 (e.g., coverage tool 440) may add the new coverage points to the original set of code coverage points. In another implementation, a different set of code coverage points may be assembled to minimize duplicate testing of successfully tested coverage points. The process may then return to block 530 and be repeated until the test results meet the analysis criteria for the second representation in block 535. In cases where particular code coverage points were excluded from subsequent test iterations (e.g., to minimize duplicate testing), the previous and subsequent test results may be merged prior to outputting the test results in block 540. Alternatively, the test results may be shown separately. The merge may be user controlled.

Figure 7:
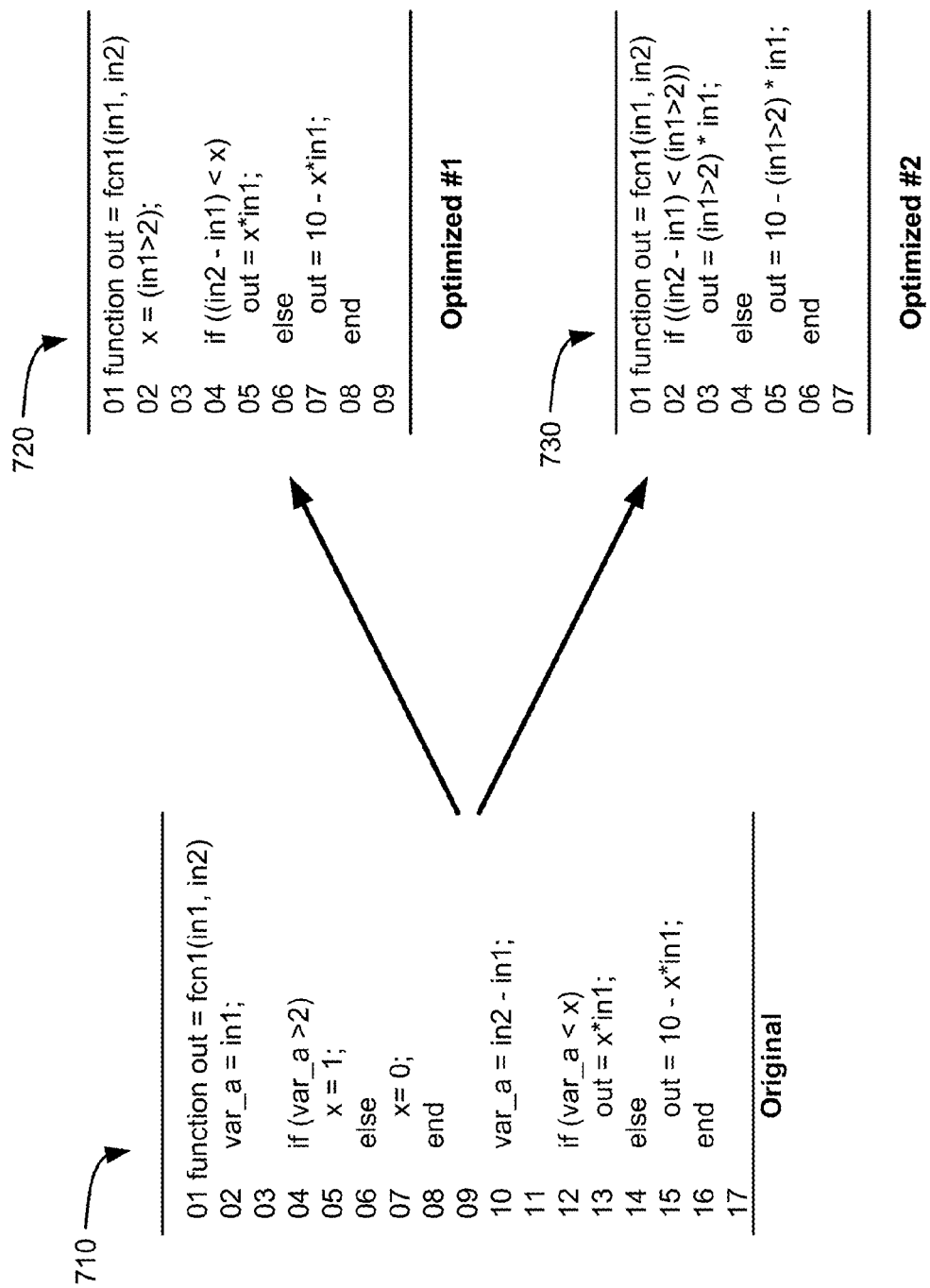

FIGS. 7 and 8 illustrate relationship between expressions in a first representation to expressions in alternate representations described in block 515 of FIG. 5. Referring to FIG. 7 an exemplary first representation of a system, program 710, is shown with two exemplary alternate representations, programs 720 and 730, being based on the first representation. A coverage outcome may correspond to a particular result from a coverage point. Coverage points correspond to expressions of program variables at a specific point in the program execution, and coverage outcomes correspond to specific values of coverage points. For example, to satisfy decision coverage for the statement at line 12 in program 710 the following conditions must be satisfied:

(var_a<x)==true, (var_a<x)==false, based on the value of var_a and x at any one time when program execution reaches step 12.

When a program is translated into a different domain (e.g., from one domain-specific language to another) or optimized (e.g., to improve memory load constraints or execution time), variables and statements can be eliminated or added. In these situations, it is necessary to identify coverage obligations in terms of the mathematical relationships that exist at each point in the program execution.

Relationships between variables can be identified by constructing control flow graphs (CFGs) and data flow graphs that describe each instance of a design. For example, by using a bipartite graph and tagging variables, it is possible to determine how an expression in one representation can be equivalently represented in the other. A bipartite graph can be constructed with the set of nodes from the first representation CFG combined with the set of nodes from the second representation CFG. An edge exists between two nodes exists if they identify the same operation. Similar bipartite graphs can be constructed for mapping variables, coverage obligations or other significant aspects in the representations. In other implementations, matching algorithms, control-flow graphs, or other techniques may be used to associate relationships between expressions in a first representation and expressions in alternate representations.

Still referring to FIG. 7, the decision coverage outcomes for line 04 in original program 710 may be:

(var_a>2)==true at line 04

(var_a>2)==false.

In the alternate representation of program 720, the coverage points can be equivalently represented as:

x==true at line 02 x==false.

While in the alternate representation of program 730, the coverage points can be equivalently represented as:

(in1>2)==true at line 02

(in1>2)==false.

Thus, it can be seen that "var_a>2" at line 04 of the original program 710 may have a test obligation (e.g., part of a first set of test obligations) to show conditions when the statement is true and conditions when the statement is false. After a second representation (i.e., alternate representation 720) is prepared, test cases to verify "var_a>2" at line 04 of the original program 710 can be generated in terms of "x" in the alternate representation 720 (e.g., "x==true", "x==false"). Similarly, after a third representation (i.e., alternate representation 720) is prepared, test cases to verify "var_a>2" at line 04 of the original program 710 can be generated in terms of "in1>2" in the alternate representation 730 (e.g., "in1>2==true", "in1>2==false").

FIG. 8 illustrates the effect of inlining a function into each of its call sites on the corresponding coverage points for decision coverage. Generally, inlining inserts the complete body of a called function in every place in the code where that function is used. Function inlining can provide high level optimization which eliminates call cost and increases the chances of other optimizations taking effect due to the breaking down of the call boundaries. However, inlining a function may increase overall code size, if multiple copies of the same code are generated for various instances.

An exemplary first representation of a system, program 810, is shown with an exemplary alternate representation 820. Program 810 includes call sites at lines 03 ("out=sub_fcn(in2, in3)") and 05 ("out=sub_fcn(-in2, in3)"). To form program 820, program 810 may be compiled so that the complete body of the called function (i.e., "sub_fcn(s_in_1, s_in_2)") is inserted in every place in the code where that function is used. Thus, alternate representation 820 may provide more explicit coverage points (e.g., due to the repetition of each sub function) than may be discernable in program 810.

Figure 9:
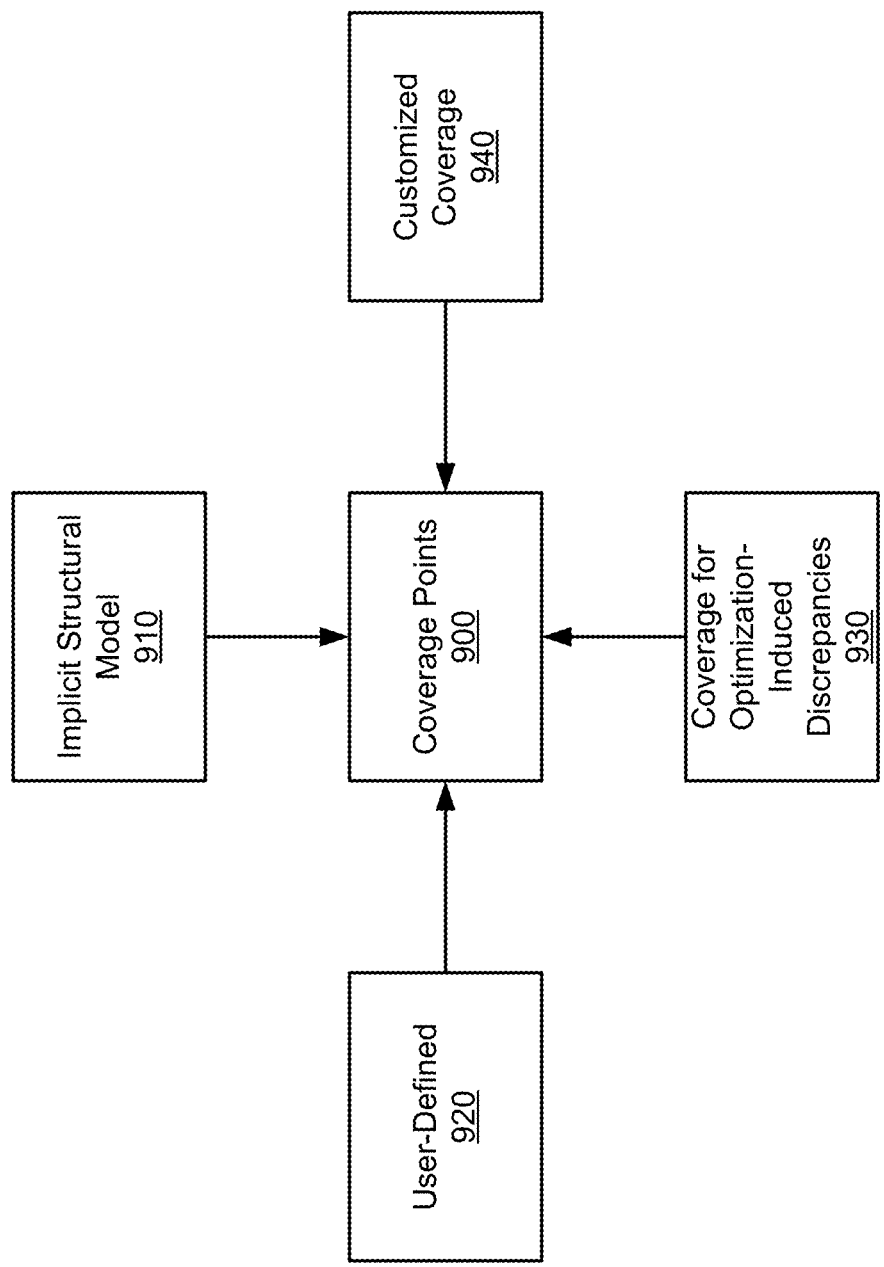
FIG. 9 is a diagram illustrating sources of code coverage points described in FIG. 5.

FIG. 9 provides a diagram illustrating sources of code coverage points described in block 520 of FIG. 5. As shown in FIG. 9, coverage points 900 may include one or more of implicit structural coverage points from the design model 910, user-defined coverage points 920, coverage for optimization induced discrepancies 930, and customized coverage 940.

Implicit structural coverage points from the design model 910 may include, for example, code sections with decision points, entry/exit points, or other expressions that can be derived from the nature of the design model. For example, a user may develop a graphical model by selecting pre-configured blocks and lines from a library of sinks, sources, linear and nonlinear components, and connectors. These elements may include implicit coverage points.

User-defined coverage points 920 may include particular coverage points defined by the user. For example, a user may identify a particular code section or model section requiring coverage.

Coverage for optimization induced discrepancies 930 may include coverage points included by a compiler (e.g., code generator 430) to overcome optimization-introduced coverage discrepancies. For example, a user may select particular code optimizations (such as code reuse, expression folding, signal storage reuse, dead-path elimination, etc.) included by the compiler to improve code efficiency. These code optimizations may cause a divergence between the code and the design model. A coverage tool (e.g., coverage tool 440) may, thus, determine coverage points in the code to account for this divergence and possibly introduced discrepancies.

Customized coverage 940 may include particular coverage points generated by user-provided sources. For example, in contrast with pre-configured blocks described above, users can also create their own blocks through user-written system functions. The functional definitions for these user-written system functions may be specified outside the context of the graphical model, for example. In some implementations, the user-written system functions may be retrieved by a compiler (e.g., code generator 430) and incorporated into an intermediate representation of the code for purposes of coverage analysis. Coverage tool (e.g., coverage tool 440) may then use the intermediate representation to identify coverage points related to the system functions. In other implementations, a coverage point may be explicitly defined in the system function.

Figure 10:
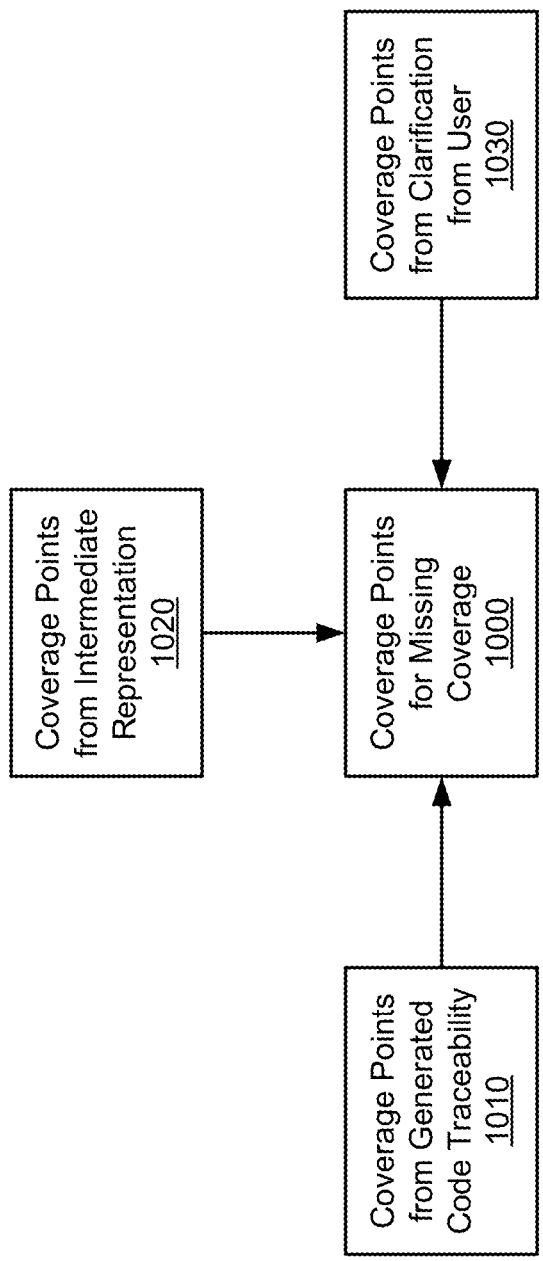
FIG. 10 is a diagram illustrating sources of missing coverage from prior iterations depicted in FIG. 7.

FIG. 10 provides a diagram illustrating sources of code coverage points for additional coverage, such as missing coverage, described in block 545 of FIG. 5. Missing coverage may be identified by code coverage tool 215 and may be translated into coverage points for the missing coverage 1000. As shown in FIG. 10, coverage points for the missing coverage 1000 may include one or more of coverage points from generated code traceability 1010, coverage points from an intermediate representation 1020, and coverage points from clarification provided by a user 1030.

Coverage points from generated code traceability 1010 may include, for example, coverage points based on coverage mapping of the model coverage and the code coverage. If missing coverage is identified in a generated code section (e.g., code from a block of the graphical model), generated code traceability features of a compiler (e.g., code generator 430) may be used to identify coverage points for the missing coverage. In one implementation, test generator 205 may map the position of a not-covered (e.g., not fully tested) code section back to a corresponding model element. For example, automatically generated code may include mapping information that describes the correspondence between code coverage and model coverage for a model. A code generator (e.g., code generator 430) may generate mapping information based on an analysis of the coverage requirements that exist in the model and the coverage requirements that exist in the code. The analysis may determine how constructs in the code that require coverage are related to constructs in the model that require coverage. Mapping between coverage of different representations is further described in co-pending U.S. patent application Ser. No. 11/970,684, titled "Mapping between Code Coverage and Model Coverage for a Design," which is commonly-owned and hereby incorporated by reference.

Coverage points from an intermediate representation 1020 may include, for example, coverage points based on user-written system functions that were incorporated into the intermediate representation of the code for purposes of coverage analysis (e.g., in block 520 of FIG. 5). If missing coverage is identified in a user-customized code section (e.g., code from a system function), a coverage tool (e.g., coverage tool 440) may use the intermediate representation to identify coverage points for the missing coverage.

Coverage points from clarification provided by a user 1030 may include, for example, direct intervention from a user. If a coverage point for missing coverage cannot be mapped back to a model node (e.g., either a block/line or system function), then test generator 205 may request the user to define the resolvable coverage points.

CONCLUSION

Systems and/or methods described herein provide automated verification of model-based code generation against user-defined coverage criteria, which may include structural code coverage and/or functional coverage derived from other design requirements. The systems and/or methods incorporate an iterative process of compiling test cases to assess code coverage and adding additional coverage points to the test cases to attain the user-defined coverage criteria.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 5, the order of the acts may be modified in other implementations. Further, non-dependent acts may be performed in parallel.

Also, the term "user" has been used herein. The term "user" is intended to be broadly interpreted to include a workstation or a user of a workstation.

Systems and/or methods described herein may be implemented within a text-based environment (e.g., MATLAB® software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® software, Stateflow® software, SimEvents™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The dynamic or run-time behavior of a model and of code may include characterized behavior such as undesired, exceptional, and erroneous behavior. The one or more constructs in the model that contribute to the characterized behavior may have corresponding constructs in code that is related to the model. This code may be automatically generated from the model. An excitation that evidences the characterized behavior for the model can be automatically generated from the model. This excitation may not evidence this behavior in the code related to the model. Information can be included in the model to enable automatic generation of an excitation from the model that evidences this behavior for the code. An excitation may be automatically generated from code that evidences characterized behavior such as undesired, exceptional, and erroneous behavior. This excitation may not evidence the behavior for the model. Information can be included in the code to enable automatic generation of an excitation that evidences such behavior for the model.

The systems and/or methods described herein may be embodied in other specific forms without departing from the spirit or essential characteristics thereof. For example, systems and/or methods disclosed herein may apply to a wide variety of graphical modeling environments in addition to block diagrams. This may include state-based or data-flow diagrams, task graph, circuit diagrams, mechanical diagrams, network diagrams, or software diagrams. The foregoing implementations are therefore to be considered in all respects illustrative rather than limiting of the described systems and methods. Scope of the systems and methods described herein is thus indicated by the appended claims, rather than the foregoing description, and all changes that come within the meaning and range of equivalency of the claims are therefore intended to be embraced therein.

What is claimed is:

1. A computing device-implemented method comprising:
    obtaining, by a processor of the computing device, a first representation of a system;
    obtaining, by the processor of the computing device, a set of test obligations,
        the set of test obligations being associated with a coverage criterion for testing the first representation;
    generating, by the processor of the computing device and based on compiling a set of coverage points for testing, one or more test cases from the first representation based on the set of test obligations;
    obtaining, by the processor, a second representation,
        the second representation being based on the first representation, and
        the second representation being different than the first representation;
    obtaining, by the processor, an analysis criterion for the second representation;
    assessing, by the processor, the analysis criterion based on applying the one or more test cases to the second representation;
    determining, by the processor, whether one or more test results satisfy the analysis criterion,
        the one or more test results being provided, by the processor, based on running the one or more test cases;
    providing, by the processor and when the one or more test results satisfy the analysis criterion, coverage results;
    identifying, by the processor and when the one or more test results do not satisfy the analysis criterion, one or more additional test obligations based on the assessing,
        the one or more additional test obligations being used to address one or more missing coverage points associated with the coverage criterion; and
    generating, by the processor, a second set of one or more test cases based on the one or more additional test obligations,
        the generating the second set of the one or more test cases including:
            translating the one or more missing coverage points into one or more new coverage points, and
            the second set of one or more test cases being used to process the one or more additional test obligations by addressing the one or more missing coverage points associated with the coverage criterion.

2. The method of claim 1, where the analysis criterion for the second representation is a coverage criterion of the second representation.

3. The method of claim 2, where a coverage criterion for the first representation and the analysis criterion for the second representation are the same.

4. The method of claim 1, where the set of test obligations include at least one of:
    a range of values for satisfying the coverage criterion, or
    one or more conditions for satisfying the coverage criterion.

5. The method of claim 1, where the first representation is a model and the second representation is code programmatically generated from the model.

6. The method of claim 1, where the first representation is generated code and the second representation is a model.

7. The method of claim 6, where the model is a graphical model.

8. The method of claim 7, where the graphical model is one or more of:
    a time-based graphical model,
    a time-based block diagram,
    a data flow diagram,
    a unified modeling language (UML) diagram, or
    a state transition diagram.

9. The method of claim 1, where the analysis criterion is one or more of:
    statement coverage,
    decision coverage,
    modified condition/decision coverage,
    condition/decision coverage, and
    path coverage.

10. The method of claim 1, where the first representation is a graphical model of the second representation.

11. A non-transitory computer-readable medium storing instructions, the instructions comprising:
    one or more instructions which, when executed by at least one processor, cause the at least one processor to:
        obtain a first representation of a system;
        obtain a set of coverage-based test obligations,
            the set of coverage-based test obligations being associated with a coverage criterion for testing the first representation;
        obtain a second representation that is related to the first representation;
        generate, based on compiling a set of coverage points for testing, one or more test cases based on the set of coverage-based test obligations;
        obtain an analysis criterion for the second representation, the second representation being based on the first representation, and
the second representation being different than the first representation;
assess the analysis criterion based on applying the one or more test cases to the second representation;
determine whether one or more test results satisfy the analysis criterion,
the one or more test results being provided based on running the one or more test cases;
provide, when the one or more test results satisfy the analysis criterion, coverage results;
identify, when the one or more test results do not satisfy the analysis criterion, one or more additional test obligations based on the assessing,
the one or more additional test obligations being used to address one or more missing coverage points associated with the coverage criterion; and
generate a second set of one or more test cases based on the one or more additional test obligations,
the one or more instructions to generate the second set of the one or more test cases including:
one or more instructions to translate the one or more missing coverage points into one or more new coverage points, and
the second set of one or more test cases being used to process the one or more additional test obligations by addressing the one or more missing coverage points associated with the coverage criterion.

12. The medium of claim 11, where the one or more instructions to identify the one or more additional test obligations based on the assessing include:
one or more instructions to map a location in the second representation to a test obligation, of the one or more additional test obligations, based on the assessing.

13. The medium of claim 12, where the one or more instructions to map the location in the second representation include:
one or more instructions to map the location based on a traceability map.

14. The medium of claim 11, where the set of test obligations include at least one of:
a range of values for satisfying the coverage criterion, or
one or more conditions for satisfying the coverage criterion.

15. The medium of claim 11, where the set of test obligations are based on structural coverage criterion for the first representation.

16. The medium of claim 11, where the first representation is a model and the second representation is code generated from the model.

17. The medium of claim 11, where the test cases are applied to at least one of the first representation or the second representation.

18. The medium of claim 11, where the first representation or the second representation is a graphical model.

19. The medium of claim 18, where the graphical model is one or more of:
a time-based graphical model,
a time-based block diagram,
a data flow diagram,
a unified modeling language (UML) diagram, or
a state transition diagram.

20. A computing device comprising:
a memory to store instructions; and
a processor to execute the instructions to:
obtain a first representation of a system,
obtain a set of test obligations,
the set of test obligations being associated with a coverage criterion for testing the first representation,
generate, based on compiling a set of coverage points for testing, one or more test cases based on the set of test obligations;
obtain a second representation,
the second representation being based on the first representation, and
the second representation being different than the first representation;
obtain an analysis criterion for the second representation;
assess the analysis criterion based on applying the one or more test cases to the second representation;
determine whether one or more test results satisfy the analysis criterion,
the one or more test results being provided, by the processor, based on running the one or more test cases;
provide, when the one or more test results satisfy the analysis criterion, coverage results;
identify, when the one or more test results do not satisfy the analysis criterion, one or more additional test obligations based on the assessing,
the one or more additional test obligations being used to address one or more missing coverage points associated with the coverage criterion; and
generate a second set of one or more test cases based on the one or more additional test obligations,
the processor, when generating the second set of the one or more test cases, being further to:
translate the one or more missing coverage points into one or more new coverage points, and
the second set of one or more test cases being used to process the one or more additional test obligations by addressing the one or more missing coverage points associated with the coverage criterion.

21. The device of claim 20, where the set of coverage points include one or more of:
implicit structural coverage points from a design model,
user-defined coverage points,
coverage points for optimization induced discrepancies, or
customized coverage points.

22. The device of claim 20, where, when identifying the one or more additional test obligations, the processor is further to:
map a location of missing coverage to generated code;
map the location of the missing coverage to an intermediate representation; or
request clarification of the one or more missing coverage points from a user.

23. A computing device-implemented system comprising:
one or more devices to:
obtain a first representation of a system;
obtain a set of test obligations from a user,
the set of test obligations being associated with a coverage criterion for testing the first representation;
obtain a second representation,
the second representation being based on the first representation, and the second representation being different than the first representation;

generate, based on compiling a set of coverage points for testing, one or more test cases based on the set of test obligations;

obtain an analysis criterion for the second representation;

assess the analysis criterion based on applying the one or more test cases to the second representation;

determine whether one or more test results satisfy the analysis criterion,
the one or more test results being provided based on running the one or more test cases;

provide, when the one or more test results satisfy the analysis criterion, coverage results;

identify, when the one or more test results do not satisfy the analysis criterion, one or more additional test obligations based on the assessing,
the one or more additional test obligations being used to address one or more missing coverage points associated with the coverage criterion; and generate a second set of one or more test cases based on the one or more additional test obligations,
the one or more devices, when generating the second set of one or more test cases, being further to:
translate the one or more missing coverage points into one or more new coverage points, and
the second set of one or more test cases being used to process the one or more additional test obligations by addressing the one or more missing coverage points associated with the coverage criterion.

24. The system of claim 23, where the one or more devices are further to:
provide the one or more test cases to an external verification tool for executing a test of the second representation.

25. The system of claim 23, where at least one of:
the first representation is a model and the second representation is code associated with the model, or
the first representation is code and the second representation is a model.

* * * * *